United States Patent
Boyd, III et al.

(10) Patent No.: US 9,717,181 B2
(45) Date of Patent: Aug. 1, 2017

(54) PIVOTABLY ADJUSTABLE ATTACHMENT APPARATUS FOR AGRICULTURAL VEHICLE

(75) Inventors: R. Stewart Boyd, III, Mount Joy, PA (US); Andrew V. Lauwers, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 902 days.

(21) Appl. No.: 13/363,557

(22) Filed: Feb. 1, 2012

(65) Prior Publication Data

US 2013/0192187 A1    Aug. 1, 2013

(51) Int. Cl.
*A01D 75/28*    (2006.01)
*A01D 41/16*    (2006.01)

(52) U.S. Cl.
CPC ............ *A01D 41/16* (2013.01); *A01D 75/28* (2013.01)

(58) Field of Classification Search
CPC ....... A01D 75/285; A01D 41/16; A01D 75/28
USPC ................ 56/12.7, 14.9, 15.5–15.9, DIG. 9, 56/DIG. 14, 228, 15.2, 118, 14.5, 13.6, 56/208–214, 10.2 R, 10.2 E, 15.1, 10.4, 56/DIG. 10
See application file for complete search history.

(56) References Cited

U.S. PATENT DOCUMENTS

| | | | |
|---|---|---|---|
| 2,251,655 A * | 8/1941 | Bostic | 56/15.8 |
| 2,251,714 A * | 8/1941 | Onions | 384/566 |
| 2,753,675 A | 7/1956 | Harp | |
| 2,780,903 A * | 2/1957 | Kroll et al. | 56/209 |
| 2,871,646 A * | 2/1959 | Heitshu et al. | 56/209 |
| 2,904,949 A | 9/1959 | Bell | |
| 2,947,134 A | 8/1960 | Clifford et al. | |
| 3,270,489 A * | 9/1966 | Rohweder | 56/15.6 |
| 3,445,146 A * | 5/1969 | Merritt et al. | 384/126 |
| 3,599,402 A * | 8/1971 | Heising et al. | 56/472 |
| 4,253,295 A | 3/1981 | Knepper | |
| 4,266,392 A | 5/1981 | Knepper et al. | |
| 4,266,395 A | 5/1981 | Basham | |
| 4,416,109 A * | 11/1983 | Slazas | 56/209 |
| 4,655,619 A * | 4/1987 | f'Geppert | 384/567 |
| 5,918,448 A | 7/1999 | Wheeler | |
| 6,012,272 A * | 1/2000 | Dillon | 56/14.6 |
| 6,510,680 B2 | 1/2003 | Uhlending et al. | |
| 7,360,351 B2 | 4/2008 | Rickert et al. | |
| 2002/0017090 A1 | 2/2002 | Hockenbeck | |
| 2004/0136632 A1* | 7/2004 | Leimann | 384/571 |

(Continued)

*Primary Examiner* — Thomas B Will
*Assistant Examiner* — Mai Nguyen
(74) *Attorney, Agent, or Firm* — Patrick M. Sheldrake

(57) ABSTRACT

A pivotably adjustable attachment apparatus for an agricultural vehicle includes an attachment connected to a mounting structure. The mounting structure is operatively connected to an adapter assembly in communication with a feed device for moving a crop from the attachment to a feed device for further processing of the crop. A frame supports the feed device over an uneven surface. An apparatus is positioned between the mounting structure and the adapter assembly. The apparatus provides a substantially non-sliding contact between the mounting structure and the adapter assembly in response to the mounting structure being directed to a pivotable movement with respect to the mounting structure, thereby providing a pivotable movement of the attachment in response to encountering the uneven surface.

19 Claims, 6 Drawing Sheets

(56) References Cited

U.S. PATENT DOCUMENTS

2007/0234845 A1* 10/2007 Gist et al. .................. 74/569
2012/0102905 A1* 5/2012 Dold et al. .................. 56/12.7

* cited by examiner

PIVOTABLY ADJUSTABLE ATTACHMENT APPARATUS FOR AGRICULTURAL VEHICLE

FIELD OF THE INVENTION

The present invention is directed to agricultural vehicles and, more particularly, to agricultural vehicles having pivotably adjustable attachment apparatus.

BACKGROUND OF THE INVENTION

Many agricultural vehicles, such as combines, have attachments, such as headers that are extremely wide and heavy. In response to encountering uneven surfaces during operation, it may become necessary to rotate the header with respect to the rest of the combine. A large pin is typically used in a conventional combine to provide a basis for relative rotational movement between the header and the rest of the combine. The contact surfaces associated with the relative rotational movement of the header with respect to other combine components is a source of friction and wear. In response, a layer of material having a lower coefficient of friction may be inserted between the contact surfaces. However, despite insertion of such a layer of material, great amounts of force must still be generated to achieve the desired rotational movement.

Accordingly, there is a need for an apparatus that provides a substantially non-sliding contact between surfaces associated with rotational movement of an agricultural vehicle attachment with respect to the rest of the vehicle.

SUMMARY OF THE INVENTION

In accordance with one aspect of the present disclosure, an agricultural vehicle includes a frame and a motor, the frame configured to carry the motor for driven movement of the frame over an uneven surface. An attachment is connected to a mounting structure, the mounting structure operatively connected to an adapter assembly in communication with a feed device for moving a crop from the attachment to the feed device for further processing of the crop. An apparatus is positioned between the mounting structure and the adapter assembly. The apparatus provides a substantially non-sliding contact between the mounting structure and the adapter assembly in response to the mounting structure being directed to a pivotable movement with respect to the mounting structure, thereby providing a pivotable movement of the attachment in response to encountering the uneven surface.

In accordance with another aspect of the present disclosure, a pivotably adjustable attachment apparatus for an agricultural vehicle includes an attachment connected to a mounting structure. The mounting structure is operatively connected to an adapter assembly in communication with a feed device for moving a crop from the attachment to a feed device for further processing of the crop. A frame supports the feed device over an uneven surface. An apparatus is positioned between the mounting structure and the adapter assembly. The apparatus provides a substantially non-sliding contact between the mounting structure and the adapter assembly in response to the mounting structure being directed to a pivotable movement with respect to the mounting structure, thereby providing a pivotable movement of the attachment in response to encountering the uneven surface.

An advantage of the apparatus of the present invention is that it provides a substantially non-sliding contact between the mounting structure and the adapter assembly during operation of a working vehicle.

Other features and advantages of the present invention will be apparent from the following more detailed description of the preferred embodiment, taken in conjunction with the accompanying drawings which illustrate, by way of example, the principles of the invention.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION OF THE INVENTION

Figure 1:
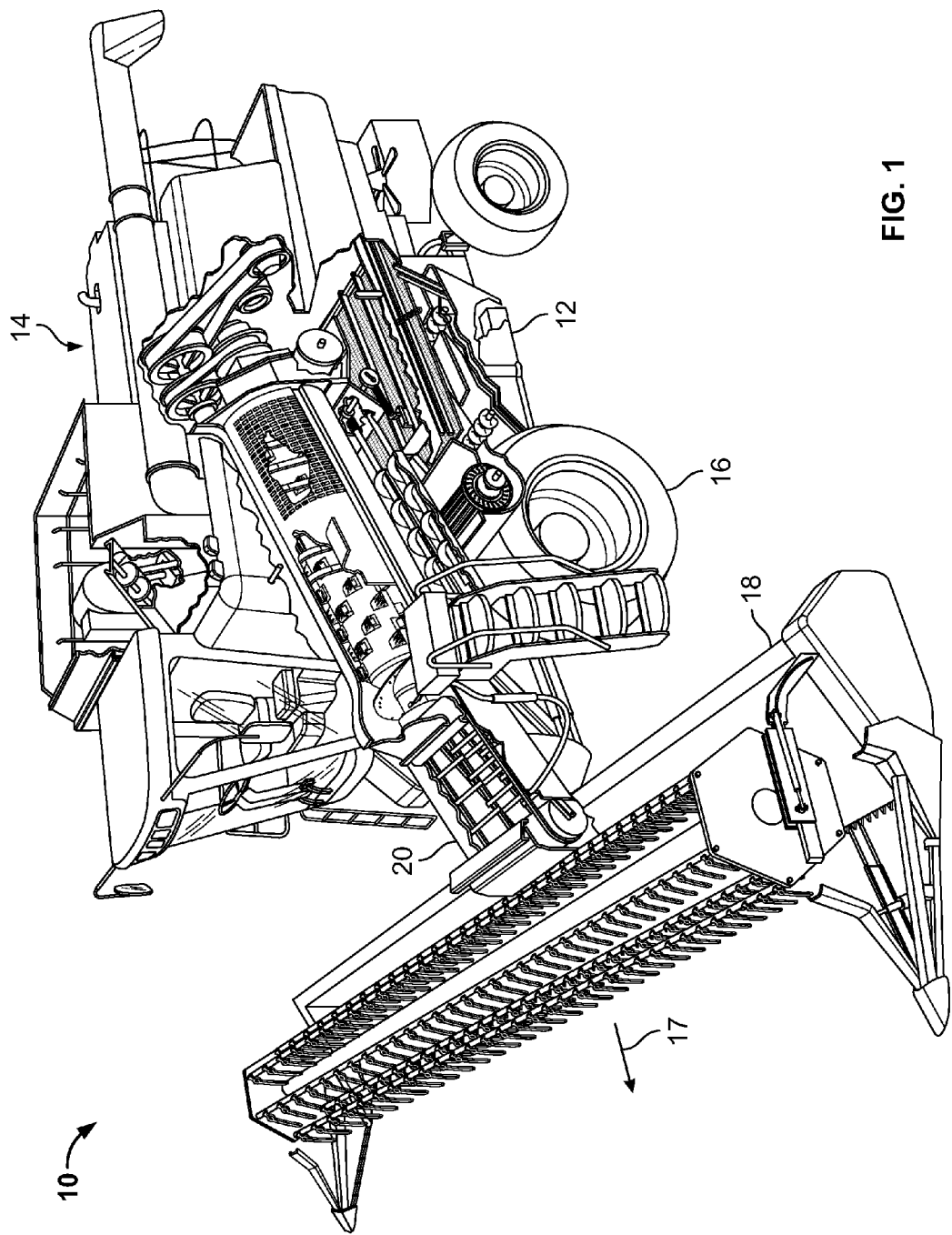
FIG. 1 is a top perspective view of an exemplary agricultural vehicle of the present disclosure.
Figure 2:
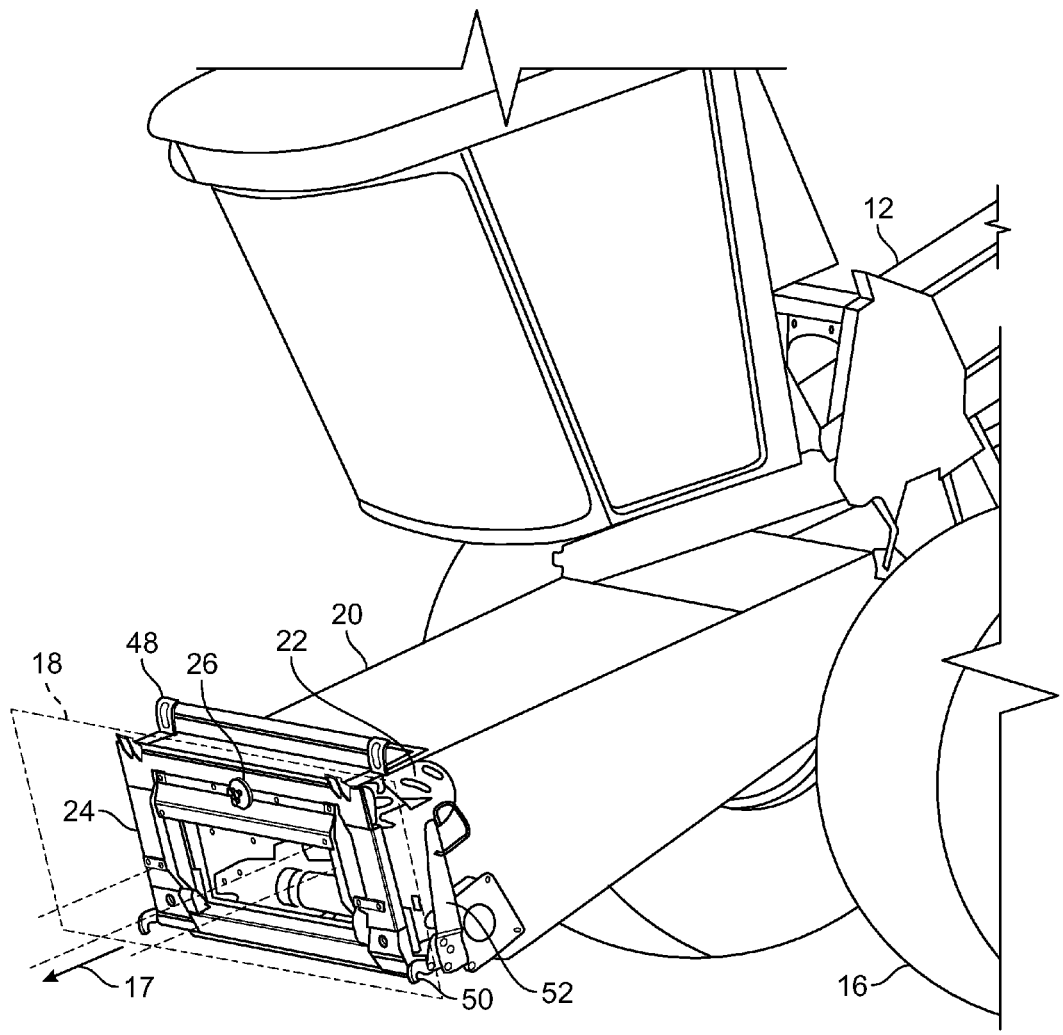
FIG. 2 is an enlarged, partial cutaway view of the agricultural vehicle of FIG. 1 the present disclosure.

Turning now to the drawings, FIGS. 1-2 depict an exemplary agricultural vehicle 10, such as a combine, including a frame 12 configured to structurally carry a motor 14 for providing driven movement of the frame 12 in a driven movement direction 17, such as by wheels 16 over an uneven surface. Frame 12 includes a feed device 20 that is operatively connected to an attachment 18, such as a header. Attachment 18 is connected to a mounting structure 24 that is operatively connected to an adapter assembly 22 that is positioned in communication with feed device 20. A crop (not shown) is typically harvested by attachment 18, with the crop being directed through mounting structure 24 and adapter assembly 22 before being provided to feed device 20 for further processing of the crop by agricultural vehicle 10 in a well-known manner.

Figure 3:
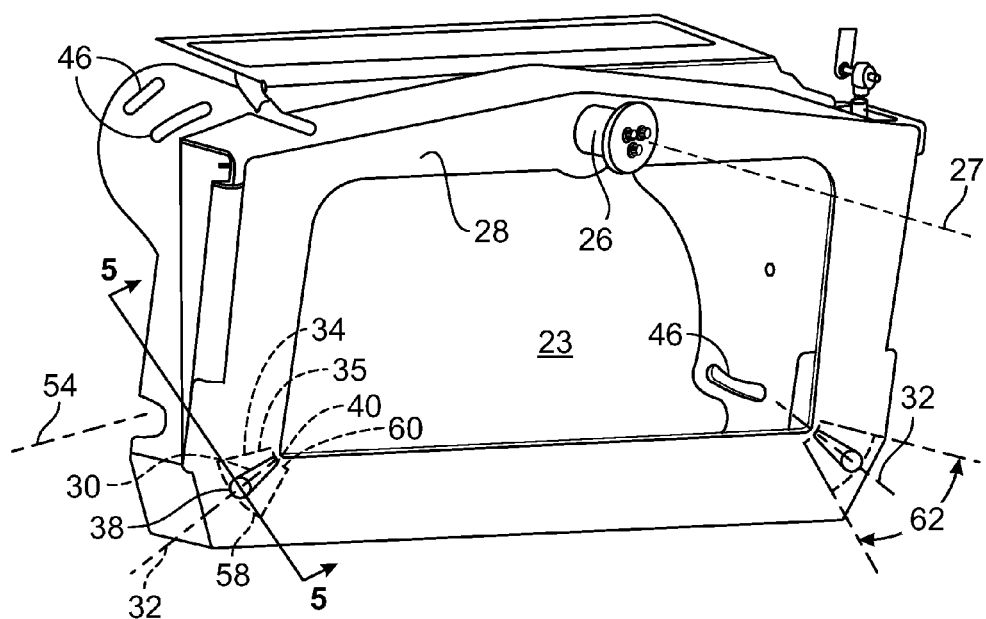
FIG. 3 is a top perspective view of an adapter assembly of the exemplary agricultural vehicle shown in FIG. 2.
Figure 4:
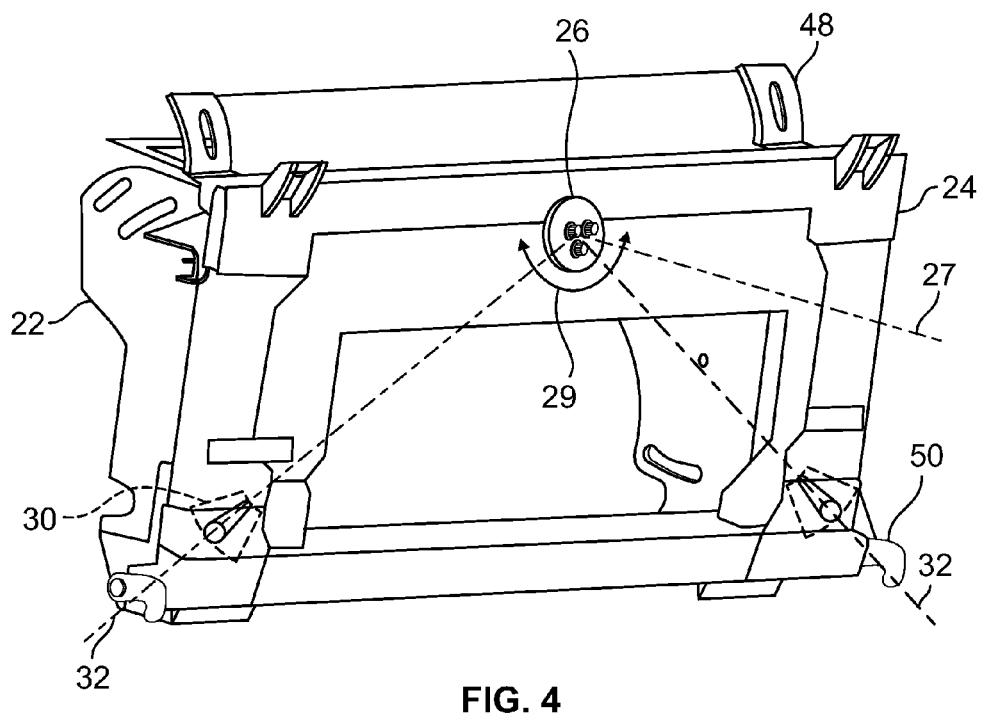
FIG. 4 is a top perspective view of a mounting structure assembled to an adapter assembly mounting structure shown in FIG. 2.

As further shown FIGS. 2-4, an upper portion 48 of mounting structure 24 in combination with retention features 50 associated with a lever assembly 52 selectably secures attachment 18 to mounting structure 24. That is, upon actuation of lever assembly 52 in one direction, retention features 50 engage a corresponding portion of attachment 18, permitting attachment 18 to be selectably secured to mounting structure 24. Actuation of lever assembly 52 in the other direction disengages retention features 50 from attachment 18, permitting attachment 18 to be separated from mounting structure 24. Adapter assembly 22 is secured over an end of feed device 20 that faces attachment 18. Adapter assembly 22 includes slotted apertures 46 in combination with fastening devices (not shown) that provide rotational adjustment about an axis 54 that is substantially transverse to driven movement direction 17 (FIG. 2). In one embodiment, each of adapter assembly 22 and mounting structure 24 are primarily composed of components that are welded together for structural rigidity. In another embodiment, adapter assembly 22 and mounting structure 24 may include a higher proportion of mechanical fasteners to secure the components of the adapter assembly and the mounting structure to each other.

As further shown in FIGS. 2-4, a pivot or pin 26 having an axis 27 extends outwardly from adapter assembly 22. When assembled with mounting structure 24, pin 26 also extends through mounting structure 24, such that mounting structure 24 is rotatably carried or pivots about axis 27 of pin 26 in rotational directions 29 with respect to adapter assembly 22. In one embodiment, a fluid ram or other device capable of generating sufficient force selectably rotates mounting structure 24 with respect to adapter assembly 22.

Figure 5:
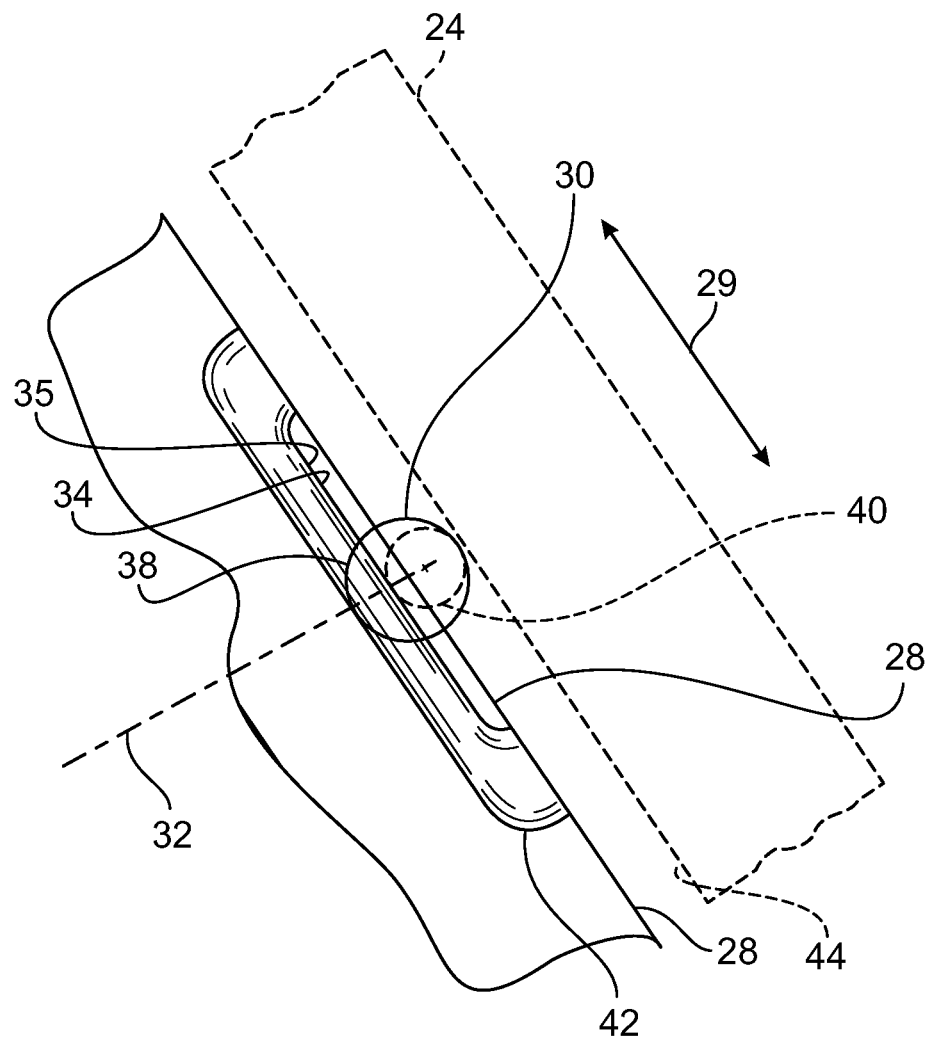
FIG. 5 is cross-section taken along line 5-5 of FIG. 3 of a recessed region of the present disclosure.

As further shown in FIGS. 3-5, adapter assembly 22 includes a surface 28 that faces a surface 44 of mounting structure 24. An apparatus 30, such as a roller, having a center axis 32 may be positioned between surfaces 28, 44. As further shown in FIG. 3, apparatus 30 is configured to travel along a predetermined path 34. In an exemplary embodiment, such as shown in FIG. 3, predetermined path 34 may include a recessed region 35 formed in at least one of surface 28 of adapter assembly 22 and surface 44 of mounting structure 24. As shown, recessed region 35 includes a first end 58 and a second end 60 to receive apparatus 30. As further shown, recessed region 35 resembles a wedge-shaped portion of a ring, such as subtending an angle 62 (FIG. 3) between opposed first end 58 and a second end 60. As further shown FIG. 3, roller or apparatus 30 is received within recessed region 35 such that a first end 38 of apparatus 30 corresponds to first end 58 of the recessed region 35 and a second end 40 of apparatus 30 corresponds to second end 60 of the recessed region 35. Since a diameter of first end 38 of apparatus 30 is larger than a diameter of the second end 40 of apparatus 30, apparatus 30 defines a taper or tapered profile.

Further, by properly sizing predetermined path 34, and as shown, recessed region 35 (opposed ends 58, 60 with respect to the opposed ends 38, 40 of apparatus 30), in response to movement along the rotational direction 29, i.e., rotation or pivotable movement of mounting structure 24 about axis 27 of pin 26, apparatus 30 rotates about its center axis 32 with the outer surface of apparatus 30 being maintained in non-sliding contact with the surface of recessed region 35 and surface 44 of mounting structure 24. As further shown FIG. 5, opposed edges 42 of recessed region 35 established rotational boundaries for apparatus 30. It is appreciated by one skilled in the art that to achieve conformal contact between apparatus 30 having a tapered profile and edge 42, the radius of edge 42 near first end 58 would correspond to the radius of first end 38 of apparatus 30. Similarly, the radius of edge 42 near second and 60 would correspond to the radius of second end 40 of apparatus 30. It is also appreciated by one skilled in the art that in this arrangement, center axis 32 of apparatus 30 (i.e., due to rolling, non-sliding travel) would travel at one half the speed of mounting structure 24. In addition, this also means that apparatus 30 travels one half the distance that mounting structure 24 travels during operation, reducing the size of predetermined path 34. By virtue of the non-sliding travel of apparatus 30 with respect to adapter assembly 22 and mounting structure 24, forces associated with rotation of mounting structure 24 with respect to adapter assembly 22 is greatly reduced.

In an exemplary embodiment, at least two apparatus 30 are utilized to permit a balancing of forces.

It is to be understood in one embodiment, predetermined path 34 does not include a recessed region 35. That is, apparatus 30 may be positioned such that the outer surface of apparatus 30 may remain in non-sliding contact between services 28, 44 of respective adapter assembly 22 and mounting structure 24, although the adapter assembly 22 and mounting structure 24 would be positioned slightly non-parallel with respect to each other, i.e., to account for the taper of apparatus 32 therebetween.

As further shown in FIGS. 3-4, center axes 32 of apparatus 30, when operating in non-sliding contact as described above, are aligned with the point of rotation (center of rotation) of mounting structure 24, or pin 26.

Figure 6:
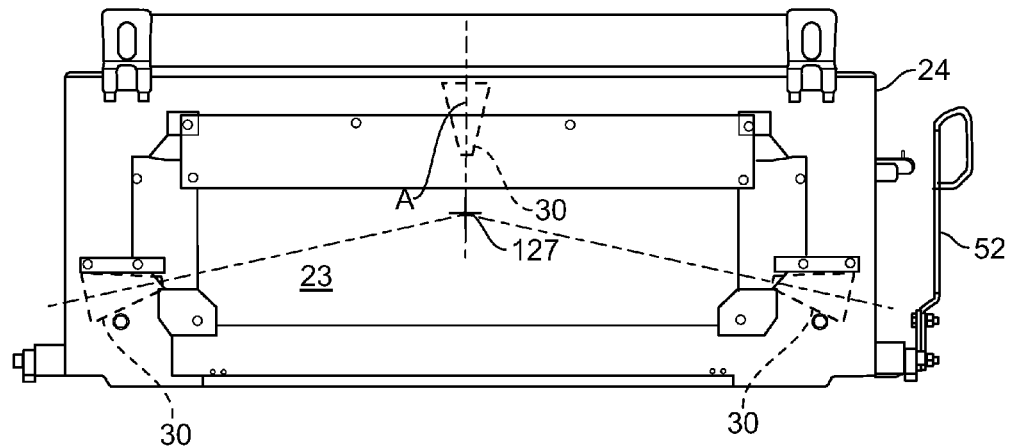
FIG. 6 is an alternate embodiment of an end view of the adapter assembly assembled to the mounting structure shown in FIG. 4 of the present disclosure.
Figure 7:
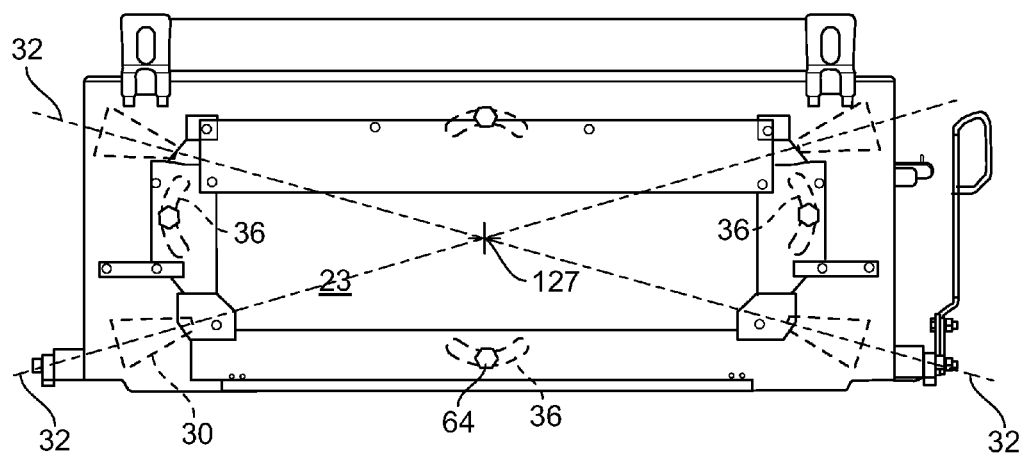
FIGS. 7-8 are end views of alternate embodiments of an adapter assembly assembled to a mounting structure of the present disclosure.
Figure 8:
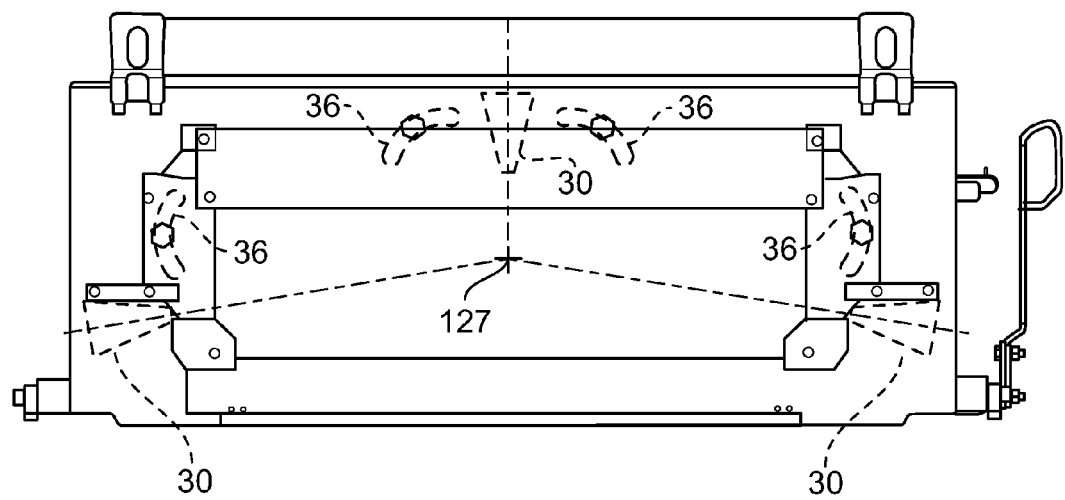

FIGS. 6-8 show alternate embodiments or arrangements of apparatus 30. For example, as shown in FIG. 6, pin 26 is removed and replaced with an apparatus 30. In combination with two other apparatus 30 distributed in symmetry with respect to mounting structure 24, the center position of rotation of mounting structure 24 may be moved to rotate about an axis 127. As shown, axis 127 substantially corresponds to a center of opening 23 formed in mounting structure 24. In addition slotted apertures 36 may be formed at different positions through adapter assembly 22 and mounting structure 24. Slotted apertures 36 includes fasteners 64 to secure adapter assembly 22 and mounting structure 24 at a proper spacing. The number and positioning of slotted apertures 36 and apparatus 30 may differ between different embodiments.

In one embodiment, an outer surface of apparatus 30 may include a layer of resilient material, permitting apparatus 30 to remain in an aligned operating position with the center of rotation of mounting structure 24 at substantially all times. In other words the spacing between adapter assembly 22 and mounting structure 24 may change, such as when attachments are removed. In such cases, apparatus 30 may move to a non-aligned position, such as by gravity, until an attachment is installed, and the attachment "cycled" or rotated sufficiently to permit alignment of apparatus 30 within each respective recessed region.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An agricultural vehicle comprising:
a frame;
a motor, the frame configured to carry the motor for driven movement of the frame over an uneven surface;
an attachment connected to a mounting structure, the mounting structure operatively connected to an adapter assembly in communication with a feed device for moving a crop from the attachment to the feed device for further processing of the crop;
an apparatus that is positioned between the mounting structure and the adapter assembly, the apparatus having a tapered profile and moveable along a predetermined path in a region of the adapter assembly upon a rotation of the attachment around a pivot; and a center of axis for the apparatus coincides with the pivot during motion of the apparatus along the predetermined path.

2. The vehicle of claim 1, wherein the agricultural vehicle is a combine.

3. The vehicle of claim 1, wherein the apparatus includes at least two rollers maintaining a spacing between the mounting structure and the adapter assembly.

4. The vehicle of claim 3, wherein each of the at least two rollers has a taper.

5. The vehicle of claim 3, wherein each of the at least two rollers has an outer layer of resilient material.

6. The vehicle of claim 4, wherein the predetermined path is along facing surfaces of the mounting structure and the adapter assembly.

7. The vehicle of claim 6, wherein the predetermined path includes a recessed region formed in at least one of the surfaces of the mounting structure and the adapter assembly to receive a roller of the at least two rollers.

8. The vehicle of claim 6, wherein the axes of the at least two rollers positioned in the predetermined path define a center of rotation of the mounting structure.

9. The vehicle of claim 6, wherein a slotted aperture is formed in at least one of the mounting structure and the adapter assembly to receive a fastening device to pivotably secure the mounting structure and the adapter assembly.

10. The vehicle of claim 6, wherein a pin assembly pivotably supports the mounting structure.

11. A pivotably adjustable attachment arrangement for an agricultural vehicle comprising:

an attachment connected to a mounting structure, the mounting structure operatively connected to an adapter assembly in communication with a feed device for moving a crop from the attachment to the feed device for further processing of the crop;

a frame supporting the feed device over an uneven surface; and an apparatus positioned between the mounting structure and the adapter assembly, the apparatus with a tapered profile wherein the apparatus tracks a preconfigured path in a region of the adapter assembly upon rotation of the attachment around a pivot associated therewith;

a center of axis for the apparatus coincides with the pivot during motion of the apparatus along the preconfigured path.

12. The apparatus of claim 11, wherein the apparatus includes at least two rollers maintaining a spacing between the mounting structure and the adapter assembly.

13. The apparatus of claim 12, wherein each of the at least two rollers has a taper.

14. The apparatus of claim 12, wherein each of the at least two rollers has an outer layer of resilient material.

15. The apparatus of claim 13, wherein the preconfigured path is along facing surfaces of the mounting structure and the adapter assembly.

16. The apparatus of claim 15, wherein the preconfigured path includes a recessed region formed in at least one of the surfaces of the mounting structure and the adapter assembly to receive a roller of the at least two rollers.

17. The apparatus of claim 15, wherein the axes of the at least two rollers positioned in the preconfigured path define a center of rotation of the mounting structure.

18. The apparatus of claim 13, wherein a slotted aperture is formed in at least one of the mounting structure and the adapter assembly to receive a fastening device to pivotably secure the mounting structure and the adapter assembly.

19. The apparatus of claim 13, wherein a pin assembly pivotably supports the mounting structure.

* * * * *